Nov. 17, 1970    R. H. A. JANSSEN    3,540,094
DEVICE FOR EXTRUDING ARTICLES
Filed April 3, 1967    9 Sheets-Sheet 1

Nov. 17, 1970     R. H. A. JANSSEN     3,540,094

DEVICE FOR EXTRUDING ARTICLES

Filed April 3, 1967     9 Sheets-Sheet 3

Reinhard Hendrik Antoon Janssen,
Inventor

By Wenderoth, Lind & Ponack,
Attorneys

United States Patent Office 3,540,094
Patented Nov. 17, 1970

3,540,094
DEVICE FOR EXTRUDING ARTICLES
Reinhard Hendrik Antoon Janssen, St. Antoniuslaan 3a,
Reuver, Netherlands
Filed Apr. 3, 1967, Ser. No. 627,777
Claims priority, application Netherlands, Apr. 4, 1966,
6604466; May 6, 1966, 6606157
Int. Cl. B28b 3/22
U.S. Cl. 25—17                                    12 Claims

ABSTRACT OF THE DISCLOSURE

An extruding device for extruding an article from clay, a synthetic material or the like, having a tubular conveying container for a plastic mass, and an annular extrusion nozzle, having an adjustable outlet for shaping an article, being connected to the tubular container. Means are provided for feeding the plastic mass along the container to the nozzle, and improved mandrel and core supporting means in association with the extrusion nozzle and adjustable outlet contribute to the improved extruding device.

---

This invention relates to a device for extruding articles from an extrudable mass of clay, or from a synthetic material like plastic, wherein said mass is extruded through an extrusion orifice or nozzle means defining the exterior configuration of the article. In this way cylindrical, oval, angular or differently formed articles of more or less great lengths may be extruded. However the resulting product has the same section throughout, i.e. the configuration of the outer contour is the same as that of the inner contour of the extrusion orifice.

The invention provides a new method for extruding articles by which it is possible to locally apply alterations in the outer contour of the article to be extruded.

For that purpose, according to the invention, a nozzle is proposed which is adapted to extrude articles from a clay, or a synthetic plastic material or the like, which nozzle consists of an annular element, the passage of which is adjustable. An elastomer may be chosen therefor. According to another characteristic the nozzle consists of a plurality of preferably radially outwardly disposed segments or the like, defining the exterior configuration of the article to be extruded, at least one of which segments is displaceable whereas means are provided for moving said segments during the extrusion.

It is therefore possible to extrude continuous longdrawn products the outer contour of which changes during the extrusion.

When, in addition, a core is used in extruding, applying the invention enables tubes or the like to be extruded, the outer contour of which has local enlargements or thickenings.

The extrusion orifice or nozzle may consist of a plate provided with a central bore the passage of which corresponds to the largest outer measurement of the article to be extruded whereas the adjustable segments or the like, in their closed or end position, are adjusted to the minimum outer measurement of the product to be made. The segments may be controlled hydraulically, pneumatically or otherwise for which purpose they are connected to a plunger which is movable within a fluid cylinder. By introducing a fluid into the cylinder, e.g. compressed air or pressurized oil, the adjustable segments or the like, or if desired only one of them, can be made to move in consequence of which contour alterations will occur during the extrusion.

Slits could purposely be made to exist in an end position of the segments in which they define the minimum contour, so enabling an article to be extruded to be provided with fins or ribs extending in its longitudinal direction.

The same principle of making the contour change could possibly also be applied to a core member. This latter should so be arranged then that its outer diameter may be enlarged or reduced.

When extruding generally according to the invention tubes are manufactured with use of a core, this latter normally is supported in a spider member. The mass to be extruded passes the spider and it has been found then that the final product acquires inferior properties in passing the arms of the spider, and does not further homogeneously adhere to the adjacent coatings and thereby manifests itself by weak spots in the final product.

The invention also comprises the spiderless extrusion of tubular articles wherein two embodiments are possible.

According to a first embodiment the main core is supported by a so-called counter-core, displaceable together with the final product, whereas in the other case, particularly in case an endless product should be made and the use of a counter-core is not possible, a minor pendulating movement of the core is taken into the matter.

In this latter case the inner wall of the formed product will bear the consequences of the core's pendulating, viz said inner wall is not straight and smooth, and shows small undulations or waves. If the wall of such a tube is sufficiently thick, the inner wall might be chiseled out or bored out.

There is another possibility of avoiding the latter disadvantage, viz to place a formed tube into a form-proof cylinder which latter therefore completely supports the tube externally, with a transformable or expansible cylinder being placed into the bore of the tube, which cylinder at any internal increase of pressure will evenly expand in radial direction. So in this latter way the crests of the undulations are pressed away into the troughs, resulting in a tube with even wall thickness. This also furthers the homogeneity of the material from which the tube is manufactured which results in a stronger product.

The process may also be reversed, i.e. by placing a nontransformable cylinder into the bore of the tube and around it a cylinder, the inside dimensions of which may be reduced. Then the tube is subjected to an equal pressure from the outside with the result that the inner diameter is evenly pressed against the cylinder disposed within the bore of the tube and that the crests are pressed away in the forementioned way. So a tube with a smooth passage is formed. A synthetic material, known as elastomer, may be chosen as transformable material, i.e. a product the molecules of which are so arranged that an increase or a reduction in diameter respectively is possible.

The method for extruding extrudable materials wherein said material is extruded by means of which the outer contour defines the other dimension of the article to be extruded, has for particularity that the means defining the outer contour are adjusted during the extrusion, with the result that the outer contour of said article is changed during the extrusion.

If in applying the invention, tubes have to be manufactured which at their ends are provided with a collar, according to the invention a tube is continuously extruded the diameter or wall thickness respectively of which is locally increased in consequence of the alteration of the operative passage of the extrusion orifice.

At such points where the formed tubular article has enlargements it is severed so that tubular products are obtained which at their ends are provided with equally formed collars or such like. Generally such collars have a smooth transition i.e. the transition from the portion having a larger diameter passes smoothly into that having a smaller diameter. By a subsequent treatment the transition may be made to occur more abruptly; if so desired the plane surface turned towards the tube body may be undercut. So tubes may be obtained which in a way still to be described can be easily coupled to form a conduit- or tube-system which at the point of coupling is flexible and able to withstand tensile forces.

Now, with the help of the drawings, the invention will be further explained.

Figure 1:
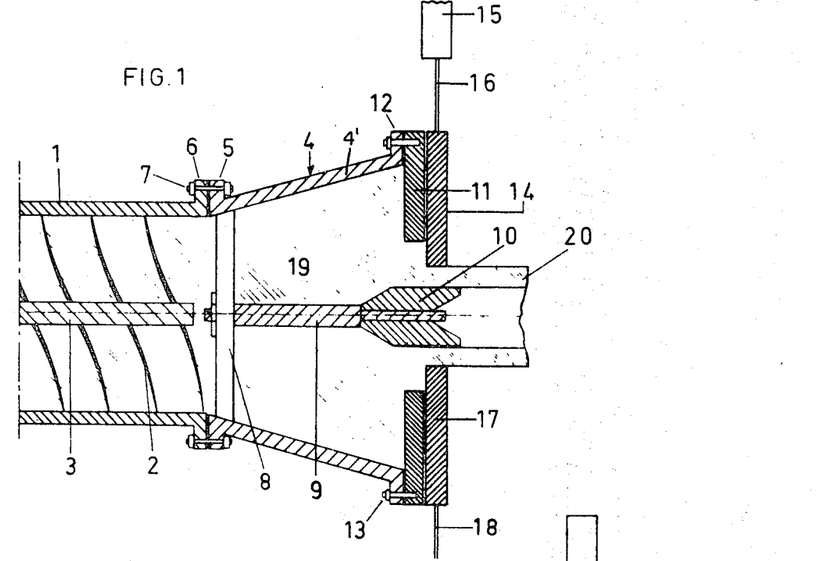
FIG. 1 shows schematically a fragmentary longitudinal section through a portion of the device according to the invention with the adjusting segments in one operative position.

In FIG. 1 the treating space for a plastic mass, especially clay, serving for manufacturing tubular products, is defined generally by means indicated by 1. Inside the means 1 which generally is of cylindrical design, a conveyor screw or worm 2 is provided which can be driven by means of a shaft 3. A conically tapering wall 4' is part of the extrusion orifice 4 which is provided with a fastening flange 5. The treating means 1 is provided with a complimentary flange 6. The flanges 5 and 6 are detachably connected to each other by means of nut and bolt connections 7 or otherwise. 8 represents a spidered support provided with passage apertures for the mass to be worked up whereas 9 represents a central mandrel rod or the like secured to the support 8 onto which mandrel rod a mandrel core 10 is fixed. 11 represents a closing plate which in its centre has a determinate passage and which plate 11 has been secured to another flange 12 of the extrusion orifice 4 by means of bolts 13 or the like. A radially movable slide segment 14 is coupled to the cylinder 15 within which a conventional piston is displaceable. Said piston, not reproduced in detail in the drawing, is connected to a rod 16 bearing the slide segment 14. Another slide segment 14 is connected to the piston rod 18 which is also provided with a piston which is displaceable within a similar cylinder (not shown). The operative passage in the bottom or end 11 of the nozzle 4 may be changed, that is to say, enlarged or reduced, by means of the segments 14 and 17. Instead of slides or segments, also a diaphragm in the way of a photographic camera could be applied, however such construction is less simple than the one represented in FIGS. 1 and 2. When a medium under pressure, e.g. pressurized air, is admitted to the cylinders to which the slides 14 and 17 have been coupled, these slides 14 and 17 may be moved from the positions shown in FIG. 1 into those shown in FIG. 2. Now the plastic mass, especially clay, indicated in the drawing by 19, is now pushed by the extruder screw 2, in the drawing (FIG. 1) to the right to form a tubular product 20 having the minimum outer diameter. The inner diameter of the tube is determined by the mandrel 10. Starting from the positions as in FIG. 1, the slides 14 and 17, by e.g. admitting medium under pressure, preferably pressurized air, can arrive in the position shown in FIG. 2 so that the thickness of the wall of the tube is considerably increased, i.e. in such case a collar 21 may be formed.

Figure 2:
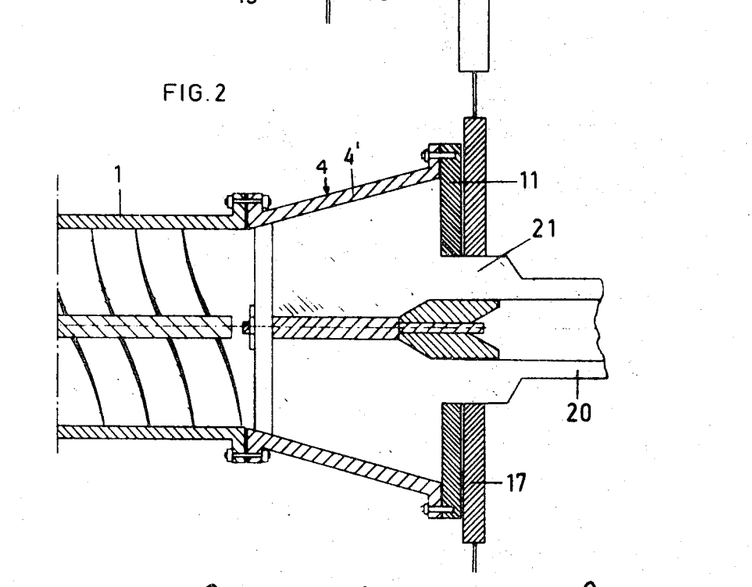
FIG. 2 shows a similar fragmentary longitudinal section through the device with said segments in another operative position.
Figure 3:
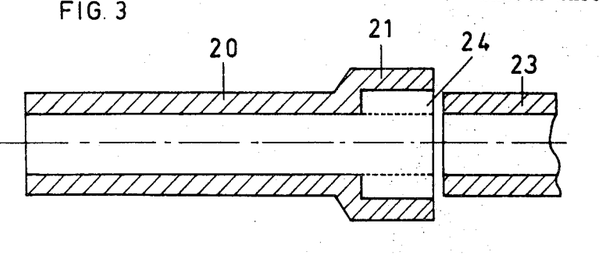
FIG. 3 depicts one form of a collar tube which can be manufactured with the device of the invention.

In FIG. 3, 20 represents a tube which may be manufactured by the device of FIGS. 1 and 2, the collar of which tube 20 is indicated by 21. An end of another tube piece 23 not having a collar may now be pushed into the collar shaped portion 21, after a chamber has been cut from the collar shaped portion 21, the dimension of which chamber corresponds to that of the tube end 23, naturally with making due allowance for a space for introducing e.g. packing material.

Figure 4:
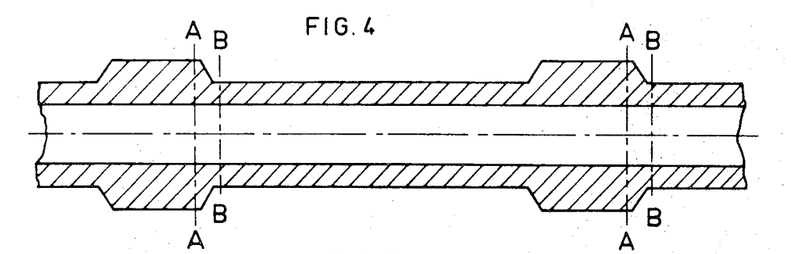
FIG. 4 depicts the product of FIG. 3 which can be delivered by the device of the invention without having been submitted to a subsequent treatment.

From FIG. 4 it appears in what way it is possible to work with the device of FIGS. 1 and 2. By moving the slides 14 and 17 intermittently, a continuous tube as shown in FIG. 4 having local enlargements is obtained. By severing this product along the lines A—A and B—B respectively, the main form of the tube of FIG. 3 is obtained. By applying, as shown, a chamber 24, tubes are then obtained capable of fitting into each other in the way indicated in FIG. 3.

Figure 5:
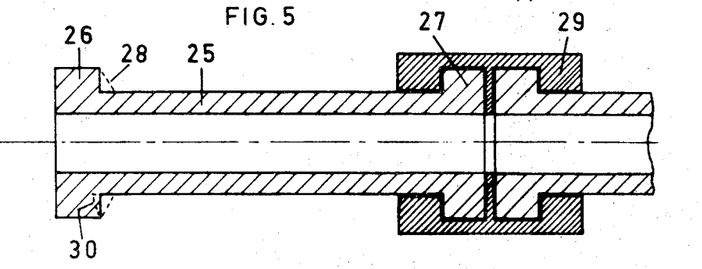
FIG. 5 depicts the manner in which two tubes, manufactured with a device according to the invention, can be mutually coupled to form a tube system.

FIG. 5 shows the way in which two tubes may be coupled to one another in which case the tube 25 is provided with a collar, 26 and 27 respectively, at both ends. Since the radial displacement of the slides 14 and 17 respectively, inwardly and outwardly respectively, takes place rather gradually, the transition of the tube in the area of the collar will also be gradual, which is indicated in FIG. 5 by 28. In an after-treatment each collar is cut off straightly as similarly indicated in FIG. 5 or each collar may be undercut as indicated at 30.

Such tubes may, as appears, from FIG. 5, simply be coupled to a substantially U-shaped rubber ring which not only provides a thorough sealing but also the possibility that the coupling as such is able to withstand tensile forces. Furthermore the coupling is flexible to some extent. Binding belts from synthetic material may be applied around the U-shaped coupling 29 which belts, after having been heated, are pulled around the tube coupling and after a second heating reassume their original dimension and clampingly surround the rubber cuff. Such a coupling will exclude any transverse movements between the tube portions, while sealing effectively and will resist great tensile forces.

In applying the invention, a tube can be manufactured having along its circumference and/or in its longitudinal direction a plurality of fortifying ribs of various dimensions, if so desired, by applying a number of slides.

Instead of clay, also a synthetic material can be worked up in the manner described by the device of the invention.

Figure 6:
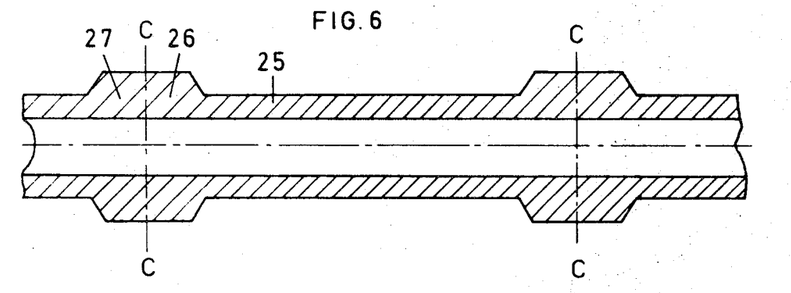
FIG. 6 depicts the product destined for manufacturing a tube according to FIG. 5, such as delivered by the device of the invention.

FIG. 6 shows the form piece as it is delivered by the device according to FIGS. 1 and 2, adapted to making the tube according to FIG. 5.

At the location of the enlargements the form piece is severed along the lines C—C, producing the collars 26 and 27 which are submitted then to the already described after-treatment for obtaining the tube constructions shown in FIG. 5.

Figure 7:
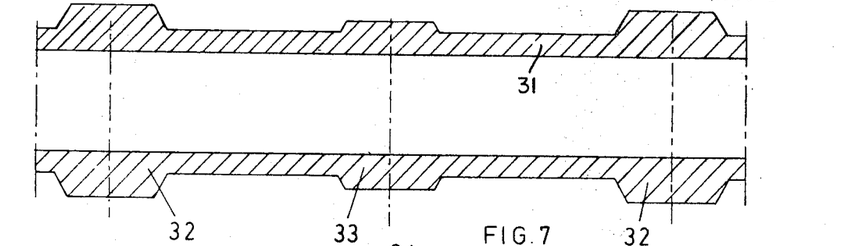
FIGS. 7–13 show some embodiments of tubes according to the invention with certain further details.

FIG. 7 shows a tube 31 cut into two pieces along the dotted line.

Figure 8:
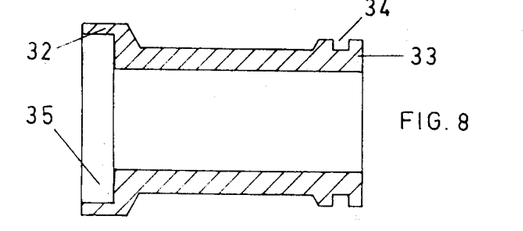
Figure 9:
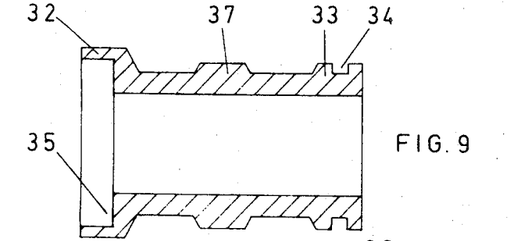
Figure 10:
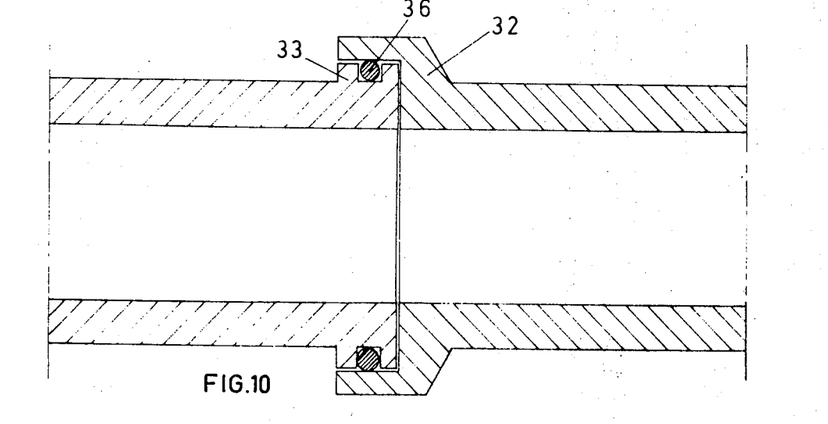

As shown in FIGS. 8–10, the ends 32 are provided with a counter-bore 35. The thickened ends have a notch 34 passing all over the circumference.

As shown in FIG. 10, a packing ring 36 may be glued into the notch 34. If so desired the tube may be provided with extra reinforcements 37 (see FIG. 9).

Figure 11:
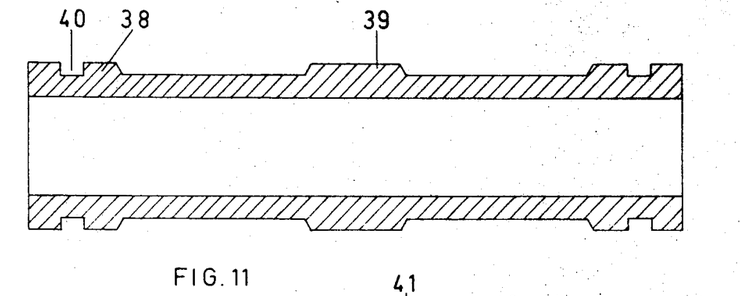
Figure 12:
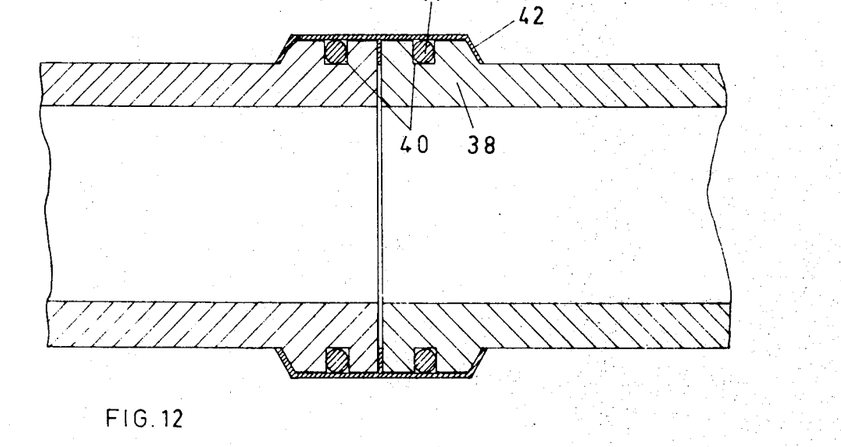
Figure 13:
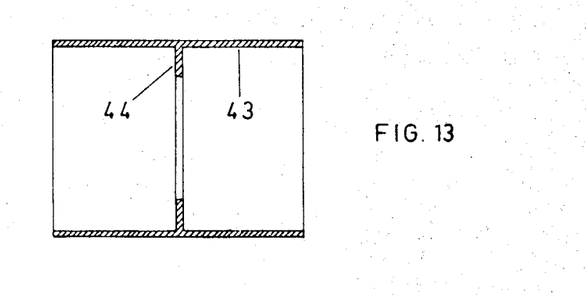

FIG. 11 shows a tube the thickened end 38 of which is provided with a circumferential groove 40. Further a stiffened collar 39 is provided. A packing ring 41 is mounted in the groove 40 as shown in FIG. 12, and the tube ends facing each other are coupled by a sleeve 42. Such a tightening sleeve may also possess the form as shown in FIG. 13. Said sleeve 43 may consist of synthetic material as also the sleeve 42, being provided with a buffer rim 44 which in mounted position is disposed between the frontal surfaces of the tube ends. Sleeves of this type are stretched in hot condition and pulled around the tube ends 38 together with the packings 41. By heating again the sleeve will shrink, then tightly encompassing the tube ends.

Figure 14:
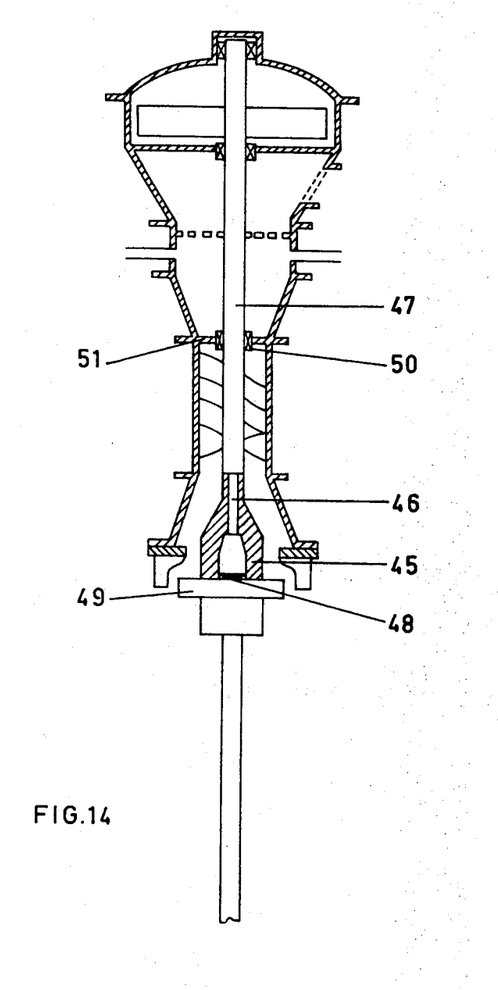
FIG. 14 shows schematically a complete representative extrusion device with a core fixed to the worm shaft.
Figure 15:
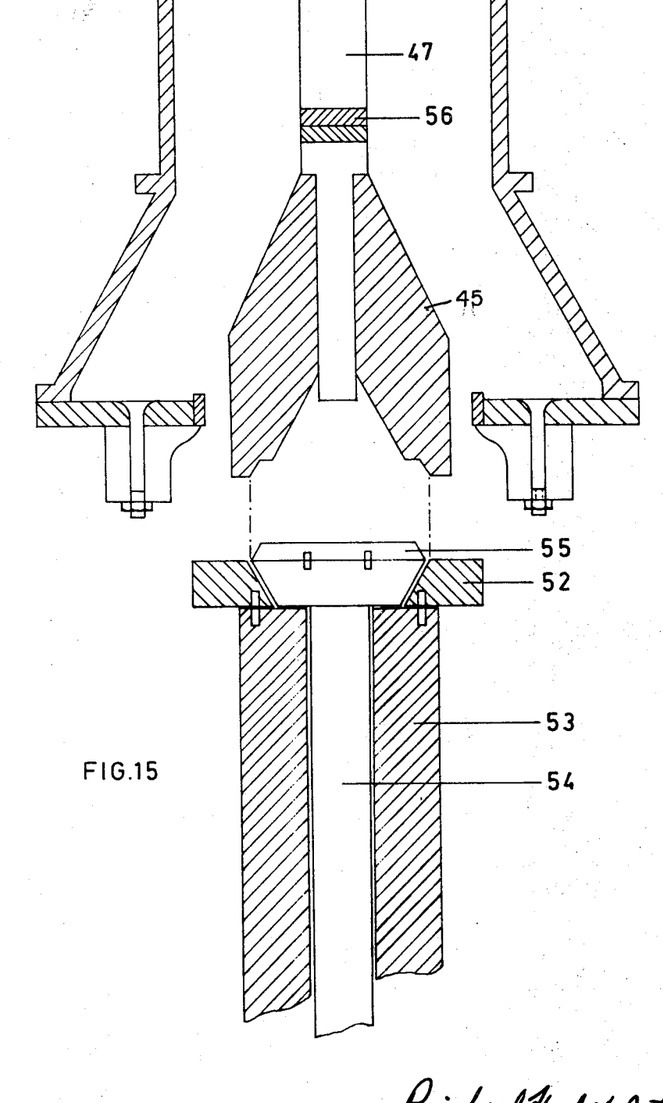
FIG. 15 shows in enlarged detail a counter-core fixed to a hollow shaft through which the shaft is passed for supporting and/or bearing the core.

In FIG. 14 an embodiment of a device according to the invention is represented in which the core 45 is secured to the mandrel 46, which is fixed to the worm shaft 47. In order to prevent the so-called pendulating, during the extrusion of the collar or socket, the thrust-bearing 48 may serve which serves as well for accomplishing an easy rotation of the core. The counter-core is indicated by 49. Also to decrease the pendulation the worm shaft 47 may be supported with the aid of a bearing 50 which is kept in place by two or more spiders 51. In FIG. 15 the shaft with the counter-core 49 of FIG. 14 has been replaced by a counter-core member 52 which is secured to a hollow shaft 53 whereas a shaft 54 supports a table 55 which is provided, if desired, with ball bearings schematically shown at 55' and is so formed that an easy centering of the core 52 which may be secured, if desired, relative to the worm shaft 47, is realized. In addition, in FIG. 15, 56 indicates a rubber connecting element in the worm shaft which partially will prevent the inner core from pendulating.

Figures 16, 17:
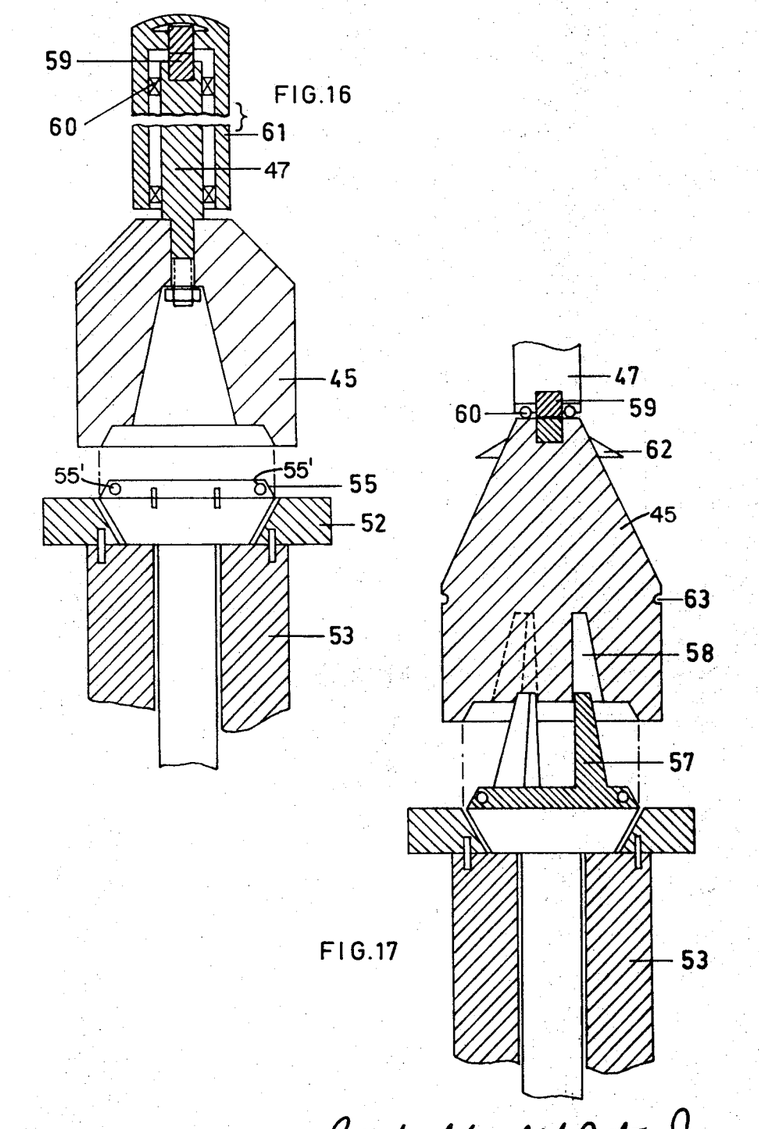
FIGS. 16 and 17 depict detailed cross-sections of two separate core forms.

If the inner core 45 is not secured to the worm shaft 47 or is only secured to it such that the worm shaft is allowed to rotate without the core rotating, the table 55 may be provided with one or more wings 57 as represented in FIG. 17, which wings or fingers in the operative position fit into corresponding recesses 58 and to preclude said rotation of the core. Said wings may be pyramidal for better facilitating the "sensing." The construction may so be carried out as to exclude tilting of the core as well as any substantial radial displacement thereof. If so desired, one thing and another may be realized with the help of magnets. In FIG. 17 also the possibility is shown of the core being retained in place with the aid of magnets 59 when the table and/or counter-core and shaft assembly to which the wings 57 are secured or associated with are retracted. If so desired, a ball bearing 60 may be fixed to the lower side of the worm shift 47, which bearing may be a thrust bearing. It is understood that during extrusion molding as the tubular articles emerge from the nozzle, the counter-core portion 52 and attached hollow shaft 53 move axially away or downward to support the article, while the center shaft 54 and center table portions 55 continue to support the inner core 45.

FIG. 16 shows an embodiment in which the inner core 45 is rotatably secured to the worm shaft 47, the ball bearings 60 providing for an easy rotation and in which magnets 59 may be employed for keeping the inner core 45 in place during the time when the table 55 does not support said inner core 45. This upper part may also be designed as a ball and socket joint. The element 61 which may be secured to the worm shaft or integrally form part of the worm shaft may be made from hard rubber or the like material, also for preventing pendulation.

It is to be understood that also in the embodiment of FIG. 16 wings and recesses as shown in FIG. 17 may be employed.

Further it should be observed that a great many variations are possible, with regard to the embodiment in which the core is firmly secured to the worm shaft as well as those in which the inner core is not firmly secured to a worm shaft or is only secured such that the core does not rotate during the rotation of said shaft.

Particularly in the case where a connection between the core 45 and worm shaft 47 does not exist, the core may be provided with one or more protrusions 62 or grooves 63, serving for keeping the core in place during the time when it is not in contact with the table 55.

Figure 18:
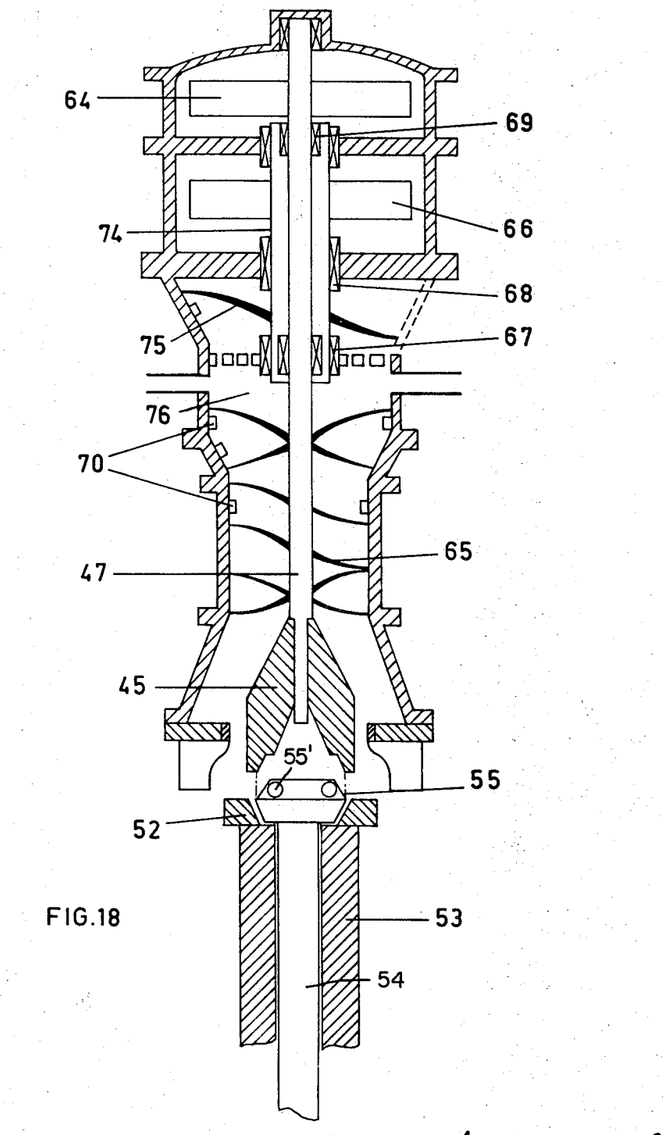
FIG. 18 is diagrammatically illustrative of a generally complete extrusion device with a multi-supported worm shaft.

FIG. 18 illustrates the case in which the worm shaft 47 is coupled to a driving or fly wheel 64 which makes the extrusion wings 65 rotate. The hollow shaft 74 with the wing 75 may be made to rotate with a different speed from that of the extrusion wings 65 by bearings 67, 68 and 69 and by applying the driving wheel 66 so that the extruding pressure and the homogeneity of the material to be extruded may be controlled. The speed of the wing 75 may also be automatized by using organs 70 reacting to pressure.

It is understood that a table and counter-core structure similar to those illustrated in FIGS. 14–18 lend themselves to use in association with the generally conically recessed end portion of the mandrel designated only generally at 10 in FIGS. 1 and 2. While in FIGS. 1 and 2 the recessed end mandrel member 10 is not illustrated in as much detail and does not show the counter-recessed portions thereof as in FIGS. 15–18, it is rather obvious to one skilled in the art that the cooperative mating of the related components can still be effected with or without such counter-recess.

Figure 19:
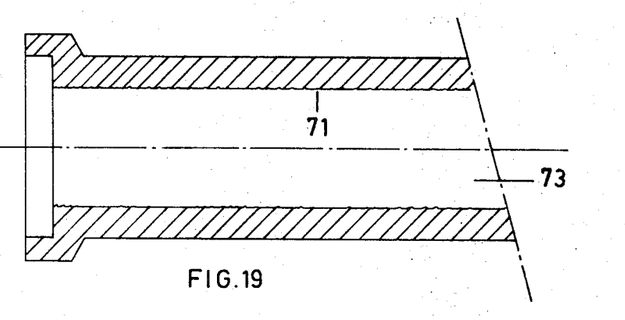
FIGS. 19 and 20 depict further fragmentary cross-sectional and elevational embodiments of a spiderlessly extruded product.

Finally FIG. 19 shows a tube piece obtained in applying the invention, in which the extrusion is performed without a spider. The inner wall 71 of the tube has undulations which may be equalized by means of a transformable cylinder (not shown) which is placed into the bore 73 of the tube.

Figure 20:
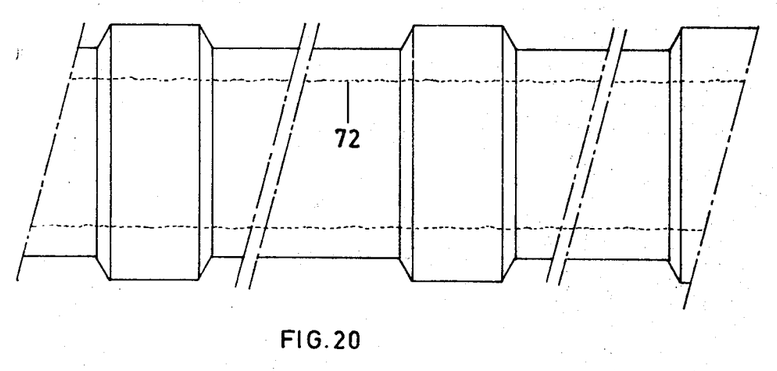

Finally FIG. 20 shows an endless tube which in applying the invention has been extruded and in which the inner wall has undulations 72. As already stated, these latter may be equalized. However, it is also possible to remove the undulations 71 and 72 respectively from the outside with a fixed inner cylinder.

The amount of material to be extruded and conveyed to the vacuum chamber 76 may be controlled independently of the transport speed of the extrusion wings 65 since for that purpose the above mentioned separate drivings are provided.

I claim:

1. An extruding device for extruding tubular pipe-like articles having lengths of variable cross-section from a plastic mass, said device comprising in combination:
    (a) a tubular container having an outlet end, for housing at least part of a plastic mass of material to be extruded;
    (b) extrusion nozzle means including a nozzle having circumferentially disposed, radially adjustable outlet means for varying the cross-sectional shape of the extruded article, and connected to the outlet end of the container;
    (c) means for conveying the plastic mass through the container and for forcing it out through said nozzle; said conveying means including a driven worm shaft centrally disposed coaxially within said container, and extruding wings operatively connected with said center shaft.
    (d) said extrusion nozzle means also including a mandrel core centered within said nozzle in coaxial alignment with said worm shaft, said core including recessed end means to cooperatively receive supplementary stabilizing means to help centrally stabilize said mandrel at least during the initial extrusion of said articles; and
    (e) stabilizing and centering means including coaxially aligned shaft-and-table means disposed outwardly of said extrusion nozzle in coaxial alignment with said tubular container and worm shaft, for cooperative centering and stabilizing engagement with said core.

2. An extruding device as defined in claim 1 wherein the stabilizing and centering shaft-and-table means for the core includes a center shaft disposed for movement relative to and within a concentric hollow shaft, a generally circular table member attached to the upper end of said center shaft for movement therewith, and a counter-core member centrally apertured to freely enclose said circular table and fixedly attached to said hollow shaft.

3. An extruding device as defined in claim 1 wherein said mandrel core and worm shaft include means for attaching said core to and for rotation with said worm shaft.

4. An extruding device as defined in claim 1 wherein said mandrel core and worm shaft include means for connecting said core to said worm shaft so as to enable said core to remain stationary while said worm shaft rotates.

5. An extruding device as defined in claim 2 wherein said mandrel core and worm shaft include means for attaching said core to and for rotation with said worm shaft.

6. An extruding device as defined in claim 5 wherein said circular table includes ball bearing means to facilitate antifriction rotation of said core relative to said center support table.

7. An extruding device as defined in claim 1 wherein said worm shaft is further supported by antifriction bearings within a concentric outer shaft, and magnetically attractable means disposed adjacently on said worm shaft and concentric outer shaft at their ends opposite to the end of said worm shaft to which said core is connected.

8. An extruding device as defined in claim 4 wherein the connecting means includes magnetically attractable means in adjacent relationship on juxtaposed portions of the core and worm shaft, respectively.

9. An extruding device as defined in claim 1 wherein the means for conveying the plastic material through said container include a hollow outer shaft and means for disposing it concentrically around a portion of said worm shaft, and extrusion wings mounted on said hollow shaft.

10. The device as defined in claim 9 wherein said worm shaft and concentric hollow shaft respectively have independent drive means associated therewith and capable of driving said respective shafts at different speeds.

11. An extruding device as defined in claim 2, further including antifriction and magnet means for connecting said core to and in co-axial alignment with said worm shaft so as to permit rotation of said worm shaft relative to said core; and interengageable wings or fingers on and projecting from said circular table for interengagement with complementary formed recesses within the recessed end portion of said core, to preclude said core from rotating with said worm shaft.

12. The device as defined in claim 1 further including a rubber element interposed between and interconnecting said worm shaft and core to help prevent or dampen pendulating tendencies of said core during rotation with said worm shaft.

References Cited
UNITED STATES PATENTS

| | | | |
|---|---|---|---|
| 371,574 | 10/1887 | Francy | 25—39 |
| 729,431 | 5/1903 | Sherry | 25—39 |
| 1,558,030 | 10/1925 | Martin | 25—39 |
| 2,554,011 | 11/1951 | Clark et al. | 25—39 |
| 3,201,844 | 8/1965 | Portras | 25—39 |
| Re. 25,570 | 5/1964 | Lemelson | 25—17 XR |
| 441,023 | 9/1889 | Fish | 25—17 |
| 1,534,826 | 4/1925 | Allison | 25—17 |
| 1,677,808 | 6/1928 | Alassio et al. | 25—17 XR |
| 2,044,961 | 6/1936 | Waner | 18—14 |
| 2,778,493 | 1/1957 | Kreidler. | |
| 3,176,494 | 4/1965 | Cullen et al. | 25—17 XR |
| 3,241,346 | 3/1966 | Doss | 18—14 XR |
| 3,292,213 | 12/1966 | Donald et al. | 18—14 |

J. SPENCER OVERHOLSER, Primary Examiner

R. S. ANNEAR, Assistant Examiner

U.S. Cl. X.R.

18—14